United States Patent
Malik

[19]

[11] Patent Number: 5,992,647
[45] Date of Patent: Nov. 30, 1999

[54] STORAGE RACK SYSTEM COMPRISING MODULAR UNITS JOINED IN BACK TO BACK RELATIONSHIP

[76] Inventor: Vijay S. Malik, 4405 Fairmount Ave., Kansas City, Mo. 64111

[21] Appl. No.: 08/932,485

[22] Filed: Sep. 18, 1997

[51] Int. Cl.[6] .............................. A47F 7/08; A47G 29/00
[52] U.S. Cl. .............................. 211/34; 211/40; 211/194; 211/37
[58] Field of Search .............................. 211/40, 194, 34, 211/37, 175, 189

[56] References Cited

U.S. PATENT DOCUMENTS

| | | | |
|---|---|---|---|
| D. 309,998 | 8/1990 | Sumrell et al. . | |
| D. 341,500 | 11/1993 | Klein et al. . | |
| 790,669 | 5/1905 | Winship . | |
| 2,276,141 | 3/1942 | Atkinson . | |
| 2,431,423 | 11/1947 | Robbins | 211/37 |
| 3,888,353 | 6/1975 | Leifheit . | |
| 4,162,013 | 7/1979 | Tucker | 211/43 |
| 4,282,977 | 8/1981 | Di Lorenzo | 211/74 |
| 4,697,713 | 10/1987 | Pryor . | |
| 4,936,467 | 6/1990 | Bobeczko | 211/14 |
| 5,035,332 | 7/1991 | Stravitz | 211/40 |
| 5,172,816 | 12/1992 | Klein et al. . | |
| 5,195,642 | 3/1993 | Dardashti | 211/40 |
| 5,222,610 | 6/1993 | Johansen et al. | 211/69.5 |
| 5,232,102 | 8/1993 | Ozawa | 211/49.1 |
| 5,415,297 | 5/1995 | Klein et al. . | |
| 5,617,959 | 4/1997 | Klein et al. | 211/37 |
| 5,730,300 | 3/1998 | Chen | 211/40 |
| 5,762,208 | 6/1998 | Yeh | 211/40 |

*Primary Examiner*—Daniel P. Stodola
*Assistant Examiner*—Gregory J. Strimbu
*Attorney, Agent, or Firm*—Richard L. Marsh

[57] ABSTRACT

A storage rack system comprises free standing modular units which are releasably joined and secured together. Each modular unit has identical parallel end frames separated by at least two parallel support tubes fitted into sockets in the front face of the frames. End frames of the units may be joined in a back to back relationship to extend the storage rack system lengthwise end to end to occupy available horizontal space and may also be releasably engaged bottom to top to occupy available vertical space. Holes for joining the frames together are within each of the sockets. The support tubes may be telescoping to assist in occupying the available horizontal space. The modular units may be optionally joined in a vertically offset relationship. The modular units of the storage rack system may be separated and rejoined in another configuration without unloading the items stored on the individual units.

14 Claims, 4 Drawing Sheets

FIG. 3

STORAGE RACK SYSTEM COMPRISING MODULAR UNITS JOINED IN BACK TO BACK RELATIONSHIP

BACKGROUND OF THE INVENTION

1. Field of the Invention

This invention relates to a storage rack system and more particularly for a storage rack system for shoes, boots, slippers, flat soled shoes, optical discs, video cartridges, computer and audio compact discs and/or storage boxes for any of the above.

2. Prior Art Statement

It is known to provide a single shoe rack having one pair of support tubes apparently supported on tube supports formed in mirror image side frames. For instance, see U.S. Design Pat. No. 341,500, issued on Nov. 23, 1993 to Richard B. Klein, et al.

Also, in the art it is known to provide a telescoping shoe rack having one or more braces extending between the upright legs of inverted "U" shaped end members having an inwardly directed loop formed in each end of each brace to clampingly support tubular rods therein. For instance, see the U.S. Pat. No. 2,276,141 issued on Mar. 10, 1942 to Truman L. Atkinson.

Is It is also known to provide a modular shoe rack or a storage rack for optical discs having a pair of support tubes supported on tube supports formed in identical side frames and adapted to be extended vertically and horizontally by additional frames and support tubes wherein a longitudinal multiple shoe rack comprises n+1 side frames. For instance, see the U.S. Pat. No. 5,172,816 issued on Dec. 22, 1992 or the U.S. Pat. No. 5,415,297 issued on May 16, 1995 both to Richard B. Klein, et al.

It is further known to provide a compact disc storage rack having multiple support tubes apparently supported in mirror image side frames. For instance, see U.S. Design Pat. No. 309,998 issued on Aug. 21, 1990 to K. Drew Sumrell, et al.

Additionally, it is known to provide a display sample trunk having multiple supports for displaying shoes which are supported on rods or tube screwed into sockets riveted to the side sections of the trunk. For instance, see the U.S. Pat. No. 790,669 issued on May 23, 1905 to S. E. Winship.

It is further known to provide multi-tier shoe case supported on the floor of a closet storage arrangement. The shoe case is mounted transverse to the closet with each tier of the shoe case being provided with three unitary horizontal shoe support members mounted to extend from the back to the front of the closet. For instance, see U.S. Pat. No. 4,697,713 issued on Oct. 6, 1987 to Nicholas Pryor.

Finally, it is known to provide a stand for the storage of shoes comprising a pair of I-shaped shoe stand supports which are provided with a plurality of sockets arranged in a quadrilateral grid and when assembled, the sockets in one support are aligned with corresponding sockets in the other support and are adapted to receive the ends of telescopic crossties for supporting shoes thereon. For instance, see the U.S. Pat. No. 3,888,353 issued on Jun. 10, 1975 to Günter Leifheit.

SUMMARY OF THE INVENTION

The prior art has provided numerous functional storage racks utilizing tubes or rods for the support of shoes, compact discs, optical discs or other objects but each such rack must be assembled utilizing mirror image side frames in order to support objects on parallel paths. Although the end frames of the U.S. Patents to Klein, et al., are identical in shape, the mirror image faces of these frames must be used to assemble the storage racks. The Klein, et al., patent also provides for end to end extension by adding additional support tubes and one end frame and extension bottom to top by adding additional units in stacking relationship, but cannot be assembled in an upwardly offset stable relationship. Nor can the rack systems of Klein, et al., be added to in the prescribed end to end fashion without greatly disturbing the objects stored thereon. In fact, to assemble a subsequent unit to a standing existing unit of Klein, et al., it is customary to remove all the objects stored thereon, then remove the existing unit from its location, stand it on one end and then hammer home the two individual tubes into the opening sockets. Finally, the n−1 side frame is then mounted to the free end of these additional support tubes to define a shoe rack system which is n units in length. Furthermore, since the units are packaged and sold with two frames and two rods, no material savings is realized as an extra end frame results for each additional end to end unit assembled to the first.

Although the end frames of the U.S. Patent to Leifheit are identical in shape, no means is provided to assemble units in and end to end assembly having means within the support sockets for rigidly affixing each additional unit to the previous unit to provide a stable unit. Furthermore, there is no teaching of multiple units being assembled in upwardly offset relationship.

Therefore, it is an object of this invention to provide a storage rack system consisting of modular units wherein each unit is adapted to be free standing and comprises parallel end frames separated by at least two parallel support tubes fitted into sockets in the front face of the frames and wherein each of the frames has means within each of the sockets for releasably joining and securing thereto an end frame of another unit back to back and/or mating means on the bottom and top surfaces to extend the storage rack system to occupy available space.

It is another object of this invention to provide a storage rack system wherein the end frames of each modular unit are identical and one of the frames is reversed such that the front faces of the frames face each other at the assembly of each of the modular units.

It is an object of this invention to provide a storage rack system which can be readily assembled, disassembled, reassembled or increased in height, width or in an offset relationship with available household tools.

It is still another object of this invention to provide a storage rack system wherein a means for releasably joining and securing parallel end frames back to back comprises an opening in the end wall of each socket extending through the end wall to a mating surface at the back face of each frame and is further adapted to slidably receive a fastener through the opening in at least one of the sockets and to be threadedly engaged in another opening at least one other of the sockets with the head of each fastener adapted to be received in the open tubular end of each support tube.

Yet still another object of this invention is to provide end frames for a storage rack system having multiple sockets in one face thereof for assembly facing the sockets in an opposing end frame wherein at least four means for releasably joining and securing remain in each end frame without respect to any two pair of sockets in each set utilized for accepting the support tubes.

Yet another object of this invention is to provide a storage rack system wherein each end frame has multiple sets of sockets arranged in at least two parallel horizontal rows and wherein each row in each set is separated vertically from the next lower row by a first distance and the lowermost row of each additional set of sockets is spaced vertically from the uppermost row of the next lower set of sockets by a second distance providing a greater variety of placements of the support tubes.

Still another object of this invention is to provide a storage rack system where the end frames of each modular unit have two sets of sockets with each set of sockets having two parallel horizontal rows.

An additional object of this invention is to provide a storage rack system having telescoping support tubes wherein the sockets in one of the end frames are greater in diameter than the sockets in the other end frame and are adapted to receive the enlarged end of telescoping support tubes in the large sockets and the smaller end of the telescoping support tubes in the small sockets. The telescoping support tubes are utilized to expand the storage system to occupy available space and/or to make the storage system adjustable to transverse objects lying upon the supporting surface of the storage system.

Yet still another additional object of this invention is to provide a storage rack system wherein each set of sockets is spaced from the next lower set of sockets a distance equal to the sum of the distance the lowermost row of the lowermost set of sockets is spaced from the bottom surface of the frame plus the distance the uppermost row of the uppermost set of sockets in spaced from the top surface of the frame less the distance between rows of a set.

More specifically, an object of this invention is to provide a storage rack system where each end frame has two sets of sockets with each set of sockets having two parallel horizontal rows for receiving a pair of support tubes in one pair of sockets which provides for forward sloping or rearward sloping storage for heeled shoes and boots, compact discs or optical discs or for flat shelf storage of boxes, flat soled slippers or deck shoes.

It is yet another object of this invention to provide a storage rack system that can be readily assembled into multiple units by assembling a subsequent unit to an existing unit without disturbing the existing units or most of the objects stored thereon.

Finally, it is an object of this invention to provide a horizontally and vertically stable storage rack system consisting of multiple modular units, each unit adapted to be free standing and comprising parallel end frames separated by at least two parallel support tubes fitted into sockets in the frames with means within each socket for releasably joining and securing thereto an end of an additional unit back to back in an upwardly offset relationship from at least one other modular storage rack.

DESCRIPTION OF THE PREFERRED EMBODIMENTS

While the various features of this invention are hereinafter described and illustrated as a modular storage rack for the storage of shoes, boots, slippers, flat soled shoes and storage boxes, it is to be understood that the various features of this invention can be used singly or in various combinations thereof to provide for storage of other objects including, but not limited to, compact discs, laser discs, video cartridges, stationery, books, magazines and the like. Those skilled in the art will best appreciate the various aspects of the preferred and alternate embodiments of this invention from a reading of the following description.

Figure 1:
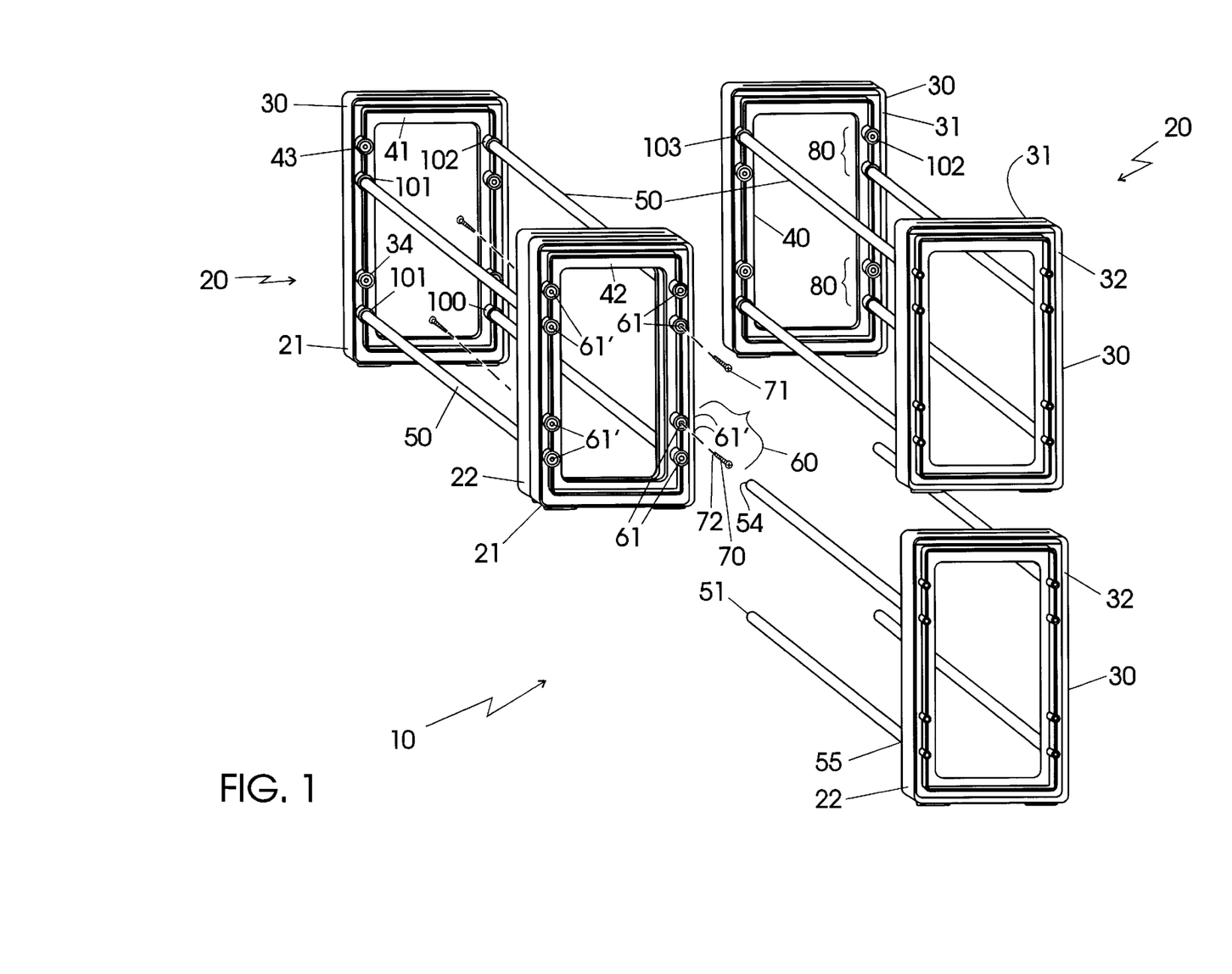
FIG. 1 is a partially exploded perspective view of an embodiment of this invention showing modular storage racks having means for joining end to end and means for joining bottom to top wherein a first pair of modular racks is joined end to end and a third modular storage rack is positioned above one of the first two showing the means for engagement bottom to top.

Referring now to FIG. 1, a storage rack system generally designated by the numeral 10 consists of modular units 20, each unit 20 being free standing comprising identical parallel end frames 30 separated by at least two parallel support tubes 50 fitted into sockets 43 formed in a boss 34 protruding from a first surface 41 of a wall 40, frames 30 having joining means 60 within sockets 43 for releasably joining and securing thereto a frame 30 of another unit 20 in back to back relationship to extend the storage rack system 10 lengthwise end to end indefinitely to occupy available horizontal space. Since frames 30 are identical, one of frames 30 must be reversed such that the front faces 31 of frames 30 face each other at assembly of modular units 20. Each modular unit 20 is then fully assembled by inserting one end 54 of at least two support tubes 50 into the desired sockets 43 in one frame 30, placing the reversed frame 30 with corresponding sockets 43 upon the opposite ends 55 of tubes 50 and tapping upon the rear face 32 of the reversed frame 30 until tubes 50 are fully seated in sockets 43. Assembled units 20 may be utilized singly or in combination with other units 20 as will be hereinafter described.

A storage rack system 10 of the present invention which comprises two or more units 20 may be formed by first assembling one modular unit 20 and then placing one frame 30 of a second unit 20 back to back with either end 21, 22 of the first unit 20 having joining means 60 aligned for securing these frames 30 together. Joining means 60 comprises an opening 61 in half of sockets 43, opening 61' in the remaining sockets 43 and fastening means 70. Each opening 61, 61' of socket 43 extends through wall 40 to a mating surface 35 at rear face 32 of frame 30, best seen in FIG. 6 and each opening 61 is adapted to slidably receive fastening means 70 therethrough to be threadedly engaged into opening 61' in another socket 43.

Fastening means 70 typically has an enlarged end 71 such as the head of a screw, bolt or rivet of a size which is adapted to be received in the tubular opening 51 of one of ends 54, 55 of support tube 50. Opening 61 is generally larger in internal diameter than opening 61' such that engaging end 72 of fastening means 70 may be frictionally engaged into opening 61' by means well known in the art. For instance, fastening means 70 which has a major diameter and a minor diameter on engaging end 72 may comprise a common sheet metal screw wherein screw threads are helically formed upon the minor diameter extending to the major diameter. Opening 61 is typically at least as large as the major diameter of the fastening means 70 while opening 61' is approximately the same as the minor diameter. Therefore, when fastening means 70 is threadedly engaged in opening 61' the screw threads frictionally engage the internal wall of opening 61'. Another means of fastening which may be employed comprises a splined, fluted or knurled rivet which also has a major diameter and a minor diameter. In the same manner as the screw, the major diameter of the rivet would be approximately the same as the inside diameter of opening 61 while the minor diameter would approximate the inside diameter of opening 61' wherein the splines, flutes or knurls frictionally engage the internal diameter of opening 61'. A threaded fastener with a mating nut, such as a common stove bolt, may be utilized to join modular units 20 one to another by passing the threaded fastener through both openings 61, 61' and threading the mating nut upon the end of the threaded fastener. In this embodiment, fastening means 70 is slidably received through opening 61 in socket 43 of one frame 30 and opening 61' in a socket 43 in another frame 30 arranged back to back with the one frame 30 at mating surface 35, thus through both openings 61, 61' in back to back sockets 43, and having a nut upon engaging end 72 thereof releasably joining the one frame 30 and the another frame 30 together in back to back relationship. The major diameter of this threaded fastener is therefore typically no larger than the inside diameter of opening 61'. Although opening 61 is generally larger than opening 61', both openings 61, 61' could be the same diameter wherein the threaded fastener may pass through both openings and have a mating nut installed thereon or may be frictionally engaged within each opening 61, 61'.

Figure 3:
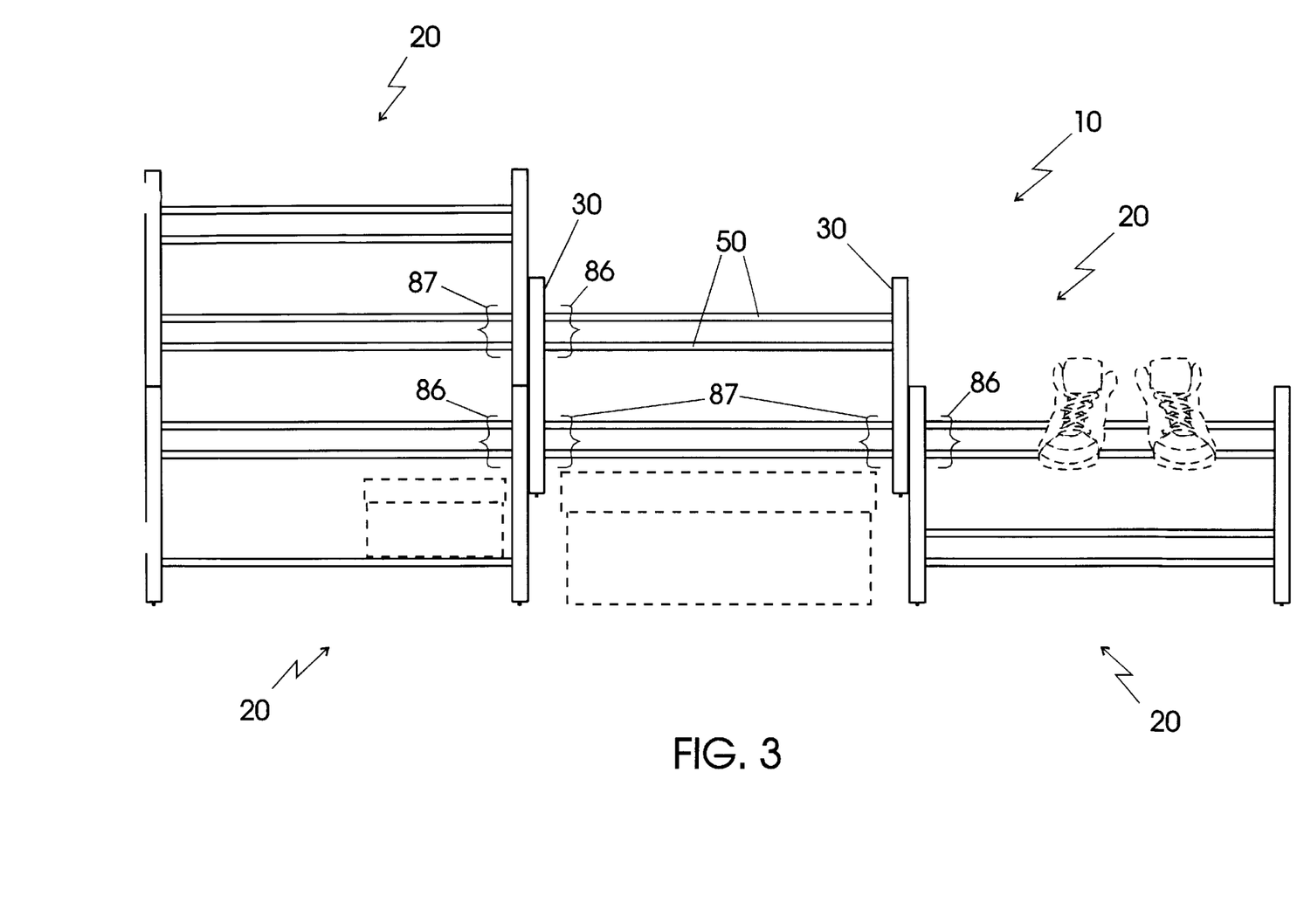
FIG. 3 is frontal elevation view of four modular storage racks joined end to end having the middle rack unit offset upwardly with the lowermost set of joining means of the elevated middle rack unit aligned with the uppermost set of joining means in the lower units.
Figure 4:
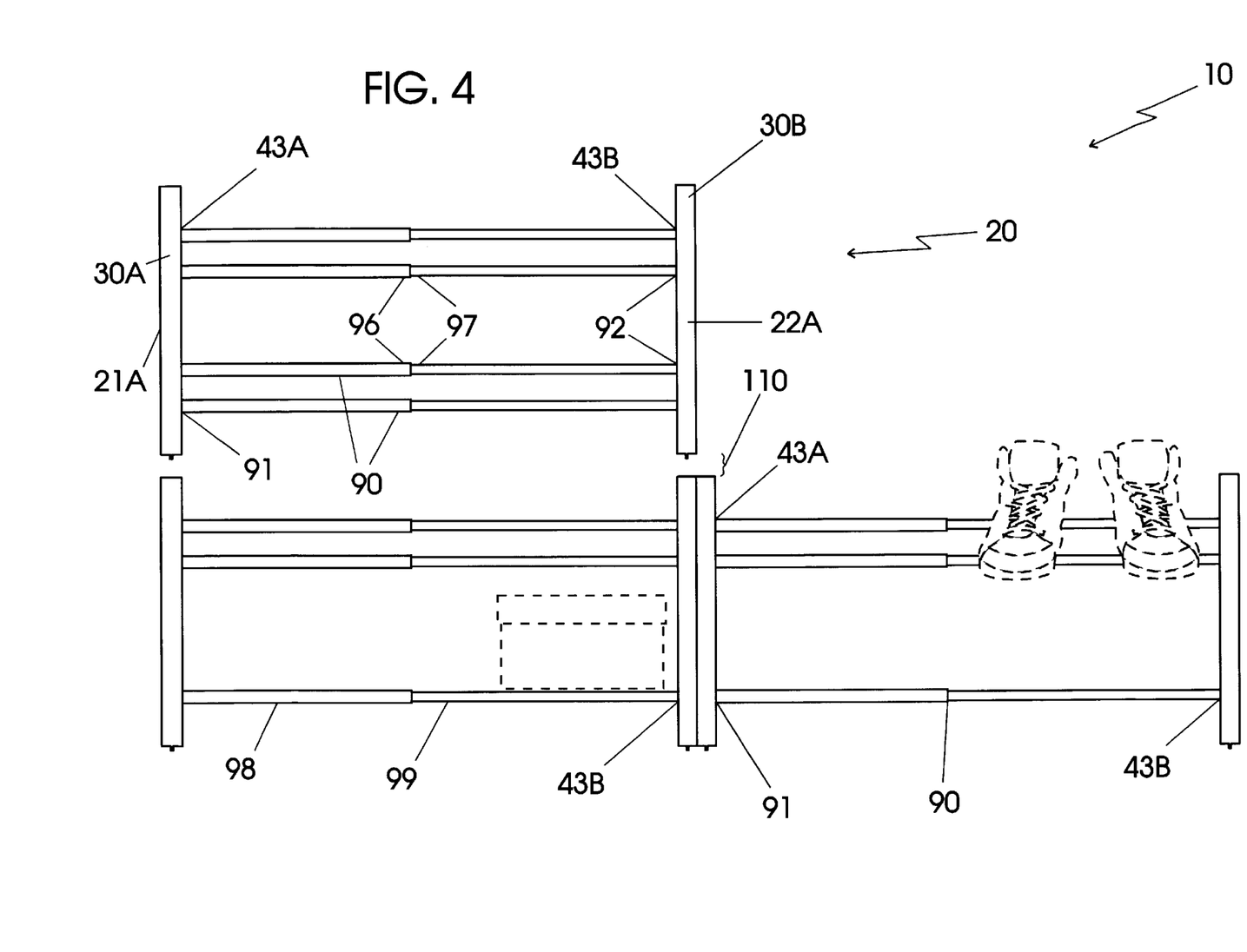
FIG. 4 is a frontal elevation view of an alternate embodiment of this invention showing two modular storage racks joined together end to end with another modular storage rack positioned above one of the first two showing the engagement of the bottom of the modular storage rack positioned above the one of the first two to the top of the one of the first two and wherein each modular storage rack has telescoping engagement tubes.

It is readily apparent that a storage rack system 10 may be constructed as shown in FIG. 3 and FIG. 4 utilizing an existing modular unit 20 without disturbing all the objects stored upon existing unit 20 by first assembling additional modular units 20 as hereinafter described and then securing each additional unit 20 to existing unit 20 by inserting fastening means 70 into available openings 61, 61' in each unit 20. Likewise, additional units 20 may be attached to the end of existing unit 20 in an upwardly offset relationship without disturbing all the objects stored upon existing unit 20 by utilizing the unique joining means 60 of this invention.

Figure 2:
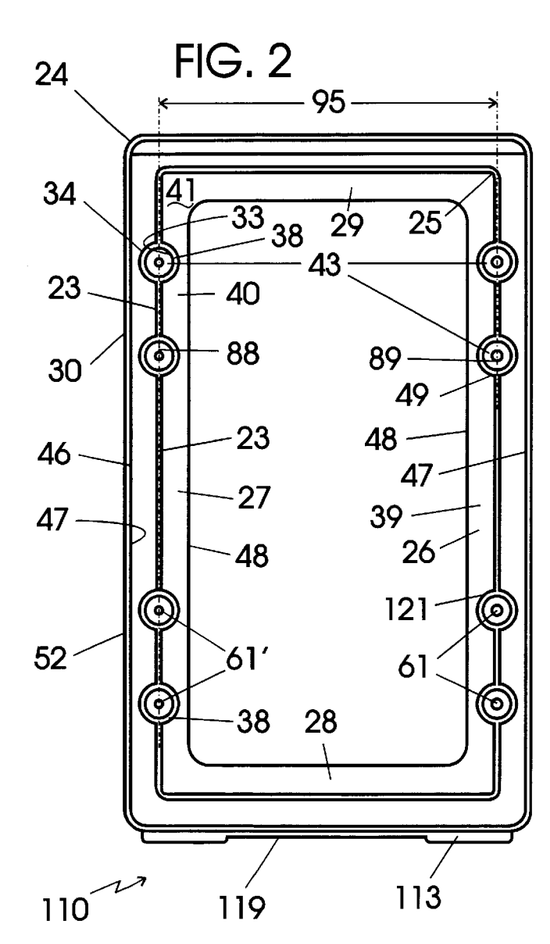
FIG. 2 is a front plan view of the preferred embodiment of one of the identical end frames showing the means for joining two end frames back to back.
Figures 5, 6:
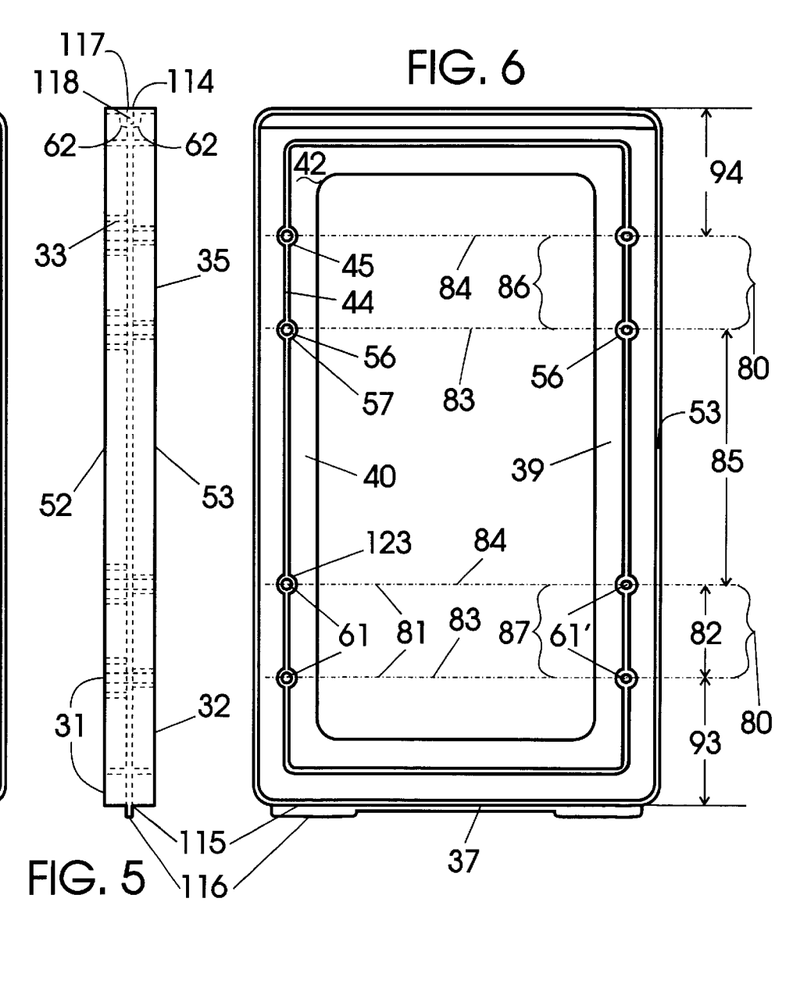
FIG. 5 is a right hand edge view of the preferred embodiment of the end frame of FIG. 2.
FIG. 6 is a rear plan view of the preferred embodiment of the rear face of the end frame of FIG. 2 showing the means for joining two end frames back to back.

As best observed in FIGS. 2, 5 and 6 each of frames 30 has multiple sets 80 of sockets 43 arranged in parallel horizontal rows 81 wherein each row 81 in each set 80 is equally separated vertically from the next lower row 81 by a first distance 82 and the lowermost row 83 of each additional set 80 of sockets 43 is spaced vertically from the uppermost row 84 of the next lower set 80 of sockets 43 by a second distance 85. Each frame 30 usually comprises two sets 80 of sockets 43, each set 80 having two parallel horizontal rows 81 as shown in FIG. 2 but may be manufactured with additional sets 80 as desired. The multiple sets 80 of sockets 43 may be utilized in a variety of arrangements utilizing support tubes 50 for storage of different objects as will be hereafter described.

Referring again to FIG. 1, one set 80 of sockets 43 may have a support tube 50 inserted in the rear, lowermost position 100 and a second support tube 50 in the forward lowermost position 101 which provides for flat shelf storage of boxes, flat soled slippers or deck shoes. In like manner, one set 80 of sockets 43 may have a support tube 50 inserted in the rear, uppermost position 102 and a second support tube 50 in the forward lowermost position 101 allowing for forward sloping storage for heeled shoes and boots. When so assembled, video cartridges and compact disc carriers or laser disc carriers may be placed with one edge upon the support tube 50 in forward lowermost position 101 having the end opposite the legend end resting against the support tube 50 engaged in rear uppermost position 102. Thus, the legend on the end of a cartridge or carrier may be observed without removal of the cartridge or carrier therefrom. In like manner, a support tube 50 may be placed in the forward uppermost position 103 with a second support tube 50 placed in the rear lowermost position 100 for rearward sloping storage of boots or shoes. Where heeled shoes or boots are stored upon support tubes 50, the front face of the heel abuts one support tube 50 while the sole rests thereupon and the toe of the shoe or boot rests upon another support tube 50. Finally, one or more sets 80 of sockets 43 may be left blank wherein no support tube is placed in those sets 80 to accommodate storage of taller boots or boxes on a lower set 80. Likewise, video cartridges may be placed with one end upon the support tube 50 in forward uppermost position 103 having the edge opposite the legend edge resting against the support tube 50 engaged in rear lowermost position 100. Compact disc carriers or laser disc carriers are best placed with one edge resting upon the support tube 50 in forward uppermost position 103 with the end opposite the legend end resting against support tube 50 in the rear lowermost position 100. Thus, the legend on the edge of the cartridge or the end of the carrier may be observed without removal of the cartridge or carrier therefrom.

Sockets 43 are substantially the same internal diameter as the outside diameter of support tube 50 and are adapted to receive either end 54 or 55 of a support tube 50 therein however, as is apparent from FIG. 4, sockets 43A in frame 30A of one end 21A of a modular unit 20 may be greater in internal diameter than sockets 43B in frame 30B of the opposing end 22A. In FIG. 4, the larger sockets 43A in frame 30A of one end 21A are sized to receive an enlarged end 91 of a telescoping support tube 90 therein while sockets 43B in frame 30B of opposing end 22B are adapted to receive a reduced end 92 of telescoping support tube 90. Sockets 43B are usually the same size as sockets 43 in identical frames 30 of FIG. 1 and FIG. 2 to reduce the number of molding changes in the production of end frames 30.

As best observed in FIGS. 2, 5 and 6 sockets 43 are formed in a boss 34 protruding from a first surface 41 of wall 40, wall 40 being centrally located between front face 31 and rear face 32 of frame 30. Bosses 34 having sockets 43 therein are shown as centered on a reinforcing rib 23 but may be free standing projections from wall 40. Sockets 43 are recessed into boss 34 from front face 31 to first surface 41 of wall 40 and have at least a portion of inner peripheral surface 33 slightly smaller in diameter than the outside diameter of support tube 50. A reinforcement means 45 for joining means 60 is centered on sockets 43 and extends from second surface 42 of wall 40 to rear face 32. Reinforcement means 45 may also be centered on a rear stiffening rib 44 as shown in FIG. 2 or may be free standing projections from rear face 32. Openings 61, 61' extend through wall 40 and through reinforcement means 45 terminating at rear face 32 coincident with mating surface 35. Wall 40 is generally centrally disposed between front face 31 and rear face 32 but could be located either toward rear face 32 or front face 31 by any amount.

Lowermost row 83 of each successive set 80 of sockets 43 is spaced from the uppermost row 84 of the next lower set 80 of sockets 43 by second distance 85 which may be equal to the sum of the distance 93 the lowermost row 83 of the lowermost set 87 of sockets 43 is spaced from the bottom surface 37 of frame 30 plus a fourth distance 94 the uppermost row 84 of the uppermost set 86 of sockets 43 is spaced from the top surface 36 of frame 30. In the preferred embodiment, each of distances 82, 85, 93 and 94 are different but any two, three or all of these distances may be equal without interrupting the unique joining means 60 of this invention. For instance, the lowermost row 83 of each set 80 of sockets 43 may be spaced from the next lower set 80 by a distance equal to twice the distance 93 the lowermost row 83 of the lowermost set 87 of sockets 43 is spaced from bottom surface 37 of frame 30.

As readily observed in FIGS. 2, 3 and 4, modular units 20 may further be stacked vertically bottom to top indefinitely to occupy available vertical space as frames 30 have means for mating 110 on the bottom 37 and top surfaces 36. In this preferred embodiment, means for mating 110 is typically a tongue 113 which projects from and may extend a major length of bottom surface 37 and a groove 114 which is formed into and may also extend a major length of top surface 36 of frame 30. Tongue 113 usually consists of multiple tongues extending from bottom surface 37 adapted to fit within a single groove 114 in top surface 36. Multiple tongues 113 may also be fitted into mating, corresponding length grooves 114.

When multiple units 20 are joined bottom to top, tongue 113 extending from bottom surface 37 of frame 30 of another modular unit 20 is adapted to mate with groove 114 in top surface 36 of frame 30 of first modular unit 20 such that bottom surface 37 of the additional unit 20 is contiguous with top surface 36 of first unit 20. In cross section, tongue 113 may have an inwardly converging molding taper from its base 115 at bottom surface 37 to its apex 116 and groove 114 may likewise have an inwardly converging taper from its base 117 at top surface 36 to its apex 118. The taper on each of tongue 113 and groove 114 may provide for the ease of assembly of one modular unit 20 upon any other modular unit. Tongue 113 is substantially the same thickness at its base 115 as groove 114 is at its base 117 and the thickness of apex 116 and apex 118 are likewise similar, such that when modular units are assembled bottom to top, tongue 113 is force fit into groove 114. In this manner, modular units 20 may be releasably secured to other modular units 20 and readily removed therefrom.

In FIG. 3, one novel feature of this invention is shown wherein at least one modular unit 20 comprising parallel end frames 30 separated by at least two parallel support tubes 50 fitted into sockets 43 in frames 30 is joined back to back in an upwardly offset relationship from a first and a third modular unit 20. Such an offset relationship is beneficial in fitting storage rack system 10 into a closet having duct work and/or plumbing passing through the closet or for fitting storage rack system 10 into dormer closets typical of older homes. Another use of the offset relationship is to form storage rack system 10 of three modular units 20 having a second unit 20 secured to frames 30 in an offset fashion from a first and third modular units 20 to provide for storage under the upwardly offset modular unit 20. Additional units 20 may be then joined bottom to top upon first unit 20 as shown in FIG. 3 or upon second offset unit or upon third unit.

In constructing the storage rack system 10 of FIG. 3, at least one of modular units 20 is secured to frame 30 of at least one additional unit 20 back to back in an upwardly offset relationship. Since lowermost row 83 of each successive set 80 of sockets 43 is spaced from the uppermost row 84 of the next lower set 80 of sockets 43 by second distance 85 equal to the sum of third distance 93 the lowermost row 83 of the lowermost set 87 of sockets 43 is spaced from the bottom surface 37 of frame 30 plus fourth distance 94 the uppermost set 86 of sockets 43 is spaced from top surface 36, two frames 30 may be joined in the above mentioned upwardly offset fashion by joining uppermost set 86 of sockets 43 on a frame 30 of a lower unit 20 to the lowermost set 87 of sockets 43 in the upwardly offset frame 30. In this manner, yet another frame 30 of a modular unit 20 may be positioned above frame 30 of the lower unit 20 having tongue 113 of the above frame 30 fitted into groove 114 of the lower unit 20 and have joining means 60 of the lowermost set 87 of the upper unit 20 align with the uppermost set 86 of the lower upwardly offset unit 20 and be secured thereto. As can readily be appreciated, additional units 20 may be built upon any of the lower units 20 in like fashion to construct a storage rack system of sufficient size to occupy the available space and accommodate the items to be stored.

Referring again to FIGS. 2, 5 and 6 frame 30 is generally rectangular in shape having two upright supports 26, 27, a top 29, a bottom 28, a front face 31 and a rear face 32. Frame 30 may have rounded corners 24 at the juncture 25 of each of the parts 26, 27, 28 & 29 and may be made of separate parts joined together at juncture 25 by suitable means, however, frame 30 is typically an integral unit made from a rigid thermoplastic material. Frame 30 comprises a wall 40 surrounded by a flange 46, flange 46 extending from front face 31 to rear face 32. The width of flange 46 is chosen to provide stability to a free standing rack 20 and is typically about seven eighths inch (⅞") wide. Wall 40 is typically centrally disposed between front face 31 and rear face 32 but may be located at any position therebetween. Wall 40 may be a solid structure extending completely from upright support 26 to upright support 27 and from top 29 to bottom 28 but usually has a central portion removed for material savings, weight reduction and aesthetics. Wall 40, therefore, comprises an annulus 39 perpendicular to and circumscribed by flange 46. Annulus 39 is approximately 1 inch in width having its inner edge 48 spaced from the inside surface 47 of flange 46. Flange 46 is approximately one eighth inch (⅛") thick at wall 40 and annulus 39 is approximately one eighth inch (⅛") thick throughout.

Wall 40 has protrusions formed on both sides thereof to provide for construction of modular units 20 by insertion of support tubes 50 in sets 80 of sockets 43 on one side thereof and means for joining additional units 20 back to back on the other side thereof. Each of sockets 43 has a peripheral wall 38 formed from a boss 34 protruding from first surface 41 of wall 40 and is approximately centered in annulus 39. Peripheral wall 38 is approximately three eighths inch (⅜") in height and approximately one eighth inch (⅛") in thickness. Reinforcing rib 23 protrudes from surface 41 of wall 40 and is also approximately centered in annulus 39 and on each boss 43. Reinforcing rib 23 connects with each peripheral wall 38 at connection point 49 and continues uninterrupted to the next peripheral wall 38 extending completely around wall 40. Reinforcing rib 23 is shown in FIG. 2 to be the same height as peripheral wall 38 and is therefore also approximately three eighths inch (⅜") in height but reinforcing rib 23 may be shorter in height than peripheral wall 38 or peripheral wall 38 may be shorter than reinforcing rib 23. In this preferred embodiment, peripheral wall 38 and reinforcing rib 23 extend to and become a part of front face 31 defined by a front edge 52 of flange 46 and therefore, are substantially the same height.

In an alternative embodiment, not shown, reinforcing rib 23 may comprise multiple reinforcement ribs 23 separately extending from wall 40 continuing uninterrupted around first surface 41, one rib disposed toward flange 46 tangent with each peripheral wall 38 and another rib disposed toward inner edge 48 of annulus 39 and tangent with each peripheral wall 38 at a point opposite the tangency of the one rib. In yet another alternative embodiment, not shown, a second flange inscribes inner edge 48 of annulus 39 extending from front face 31 to rear face 32. In yet another embodiment, not shown, multiple reinforcing ribs 23 are constructed on side supports 26, 27 while top 28 and bottom 29 have only one centrally disposed reinforcing rib 23. Each of these alternative embodiments may also include other intermediate reinforcement ribs without departing from the scope of this invention.

Referring again to FIGS. 2, 5 and 6 sockets 43 are arranged in parallel horizontal rows 81 and in sets 80, sets 80 spaced vertically on first surface 41 of wall 40. Each row 81 contains a front socket 88 and a rear socket 89 aligned vertically with front sockets 88 and rear sockets 89 respectively in each successive row 81. Front sockets 88 and rear sockets 89 are separated by a horizontal distance 95 which is less than the distance from the heel to the toe of a womans' shoe such that same may be placed upon support tubes 50 with the front face of the heel abutting one support tube 50 while the sole rests thereupon and the toe of the shoe or boot rests upon another support tube 50. It is preferable that distance 95 between front sockets 88 and rear sockets 89 be approximately five and three quarters inches (5¾") and distance 82 between lower row 83 and upper row 84 be approximately one and five eighths inches (1⅝") allowing for a shoe to rest upon a support tube 50 in the upper row 84 while the toe rests upon support tube 50 in lower row 83, the sole of the shoe normally forming an angle with the horizontal. Lowermost row 83 of lowermost set 87 of sockets 43 is spaced from bottom surface 37 by third distance 93 of approximately two and one eighths inches (2⅛") which when coupled with distance 82, uppermost row 84 of lowermost set 87 of sockets 43 allows at least a four inch (4") heel of a woman's' shoe to be placed upon the support tube 50 in the uppermost row 84 without resting the heel of the shoe on the supporting surface for the modular unit 20. Uppermost row 84 of uppermost set 86 is then spaced from top surface 36 of frame 30 at fourth distance 94 which may be equal to third distance 93. Lowermost row 83 of the next upper set 86 of sockets 43 is then spaced from uppermost row 84 of the next lower set 80 by second distance 85 equal to the sum of the third distance 93 and fourth distance 94. It can readily be observed then, that frames 30 may be arranged back to back with their rear faces 32 defining mating surface 35 and be moved in an upwardly offset fashion to align openings 61, 61' of joining means 60 of any lower set 87 with any upper set 86. Where more than two sets 80 of sockets 43 are formed in frames 30, the lowermost set 87 of one frame 30 may be aligned with lowermost set 87 of a second frame 30 such that both frames 30 rest upon the same supporting surface, or the lowermost set 87 of a second frame 30 may be aligned with another set (not shown) of sockets 43 of a first frame 30 and secured thereto. Finally, it is possible with the arrangement of sockets 43 in frames 30 to have the uppermost set 86 of sockets 43 of a first frame 30 align with the lowermost set 87 of a second frame 30 providing the maximum vertical offset. FIGS. 1–4 show only two sets 80 of sockets 43 in each of frames 30, but it is understood that any number of sets 80 of sockets 43 may be provided in frames 30 without departing from the scope of this invention.

Similarly, for angled storage of video cartridges and compact disc or laser disc carriers, distance 82 between lower row 83 and upper row 84 may be approximately three quarters of an inch (¾") allowing for video cartridges and compact disc or laser disc carriers to be placed with one edge upon the support tube 50 in forward lowermost position 101 of lower row 83 while having the end opposite the legend end resting against the support tube 50 engaged in rear uppermost position 102 in the upper row 84 wherein the cartridge or carrier normally forms an angle with the horizontal. Lowermost row 83 of lowermost set 87 of sockets 43 is spaced from bottom surface 37 by third distance 93 of approximately three and one sixteenths inches (3 1/16") which when coupled with distance 82, allows the legend end of the carrier or cartridge to be easily read. It is readily apparent that frames 30 could have more than two rows 81 of sockets 43 in each set 80 wherein distance 82 between each successive row 81 establishes the proper distance for storage of carriers or cartridges between any two adjacent pairs of rows 81 or establishes the proper distance for storage of shoes between any two pairs of rows 81 separated by one other pair. Where sockets 43 are spaced apart by three quarters of an inch (¾"), peripheral wall 38 of these adjacent sockets 43 are tangent at point 49 as the outside diameter of each peripheral wall 38 is three quarters of an inch (¾"). Thus a fillet may be utilized on both sides of connection point 49 to provide for the joining of one outer peripheral wall 38 to the peripheral wall 38 of the adjacent socket 43. If desired, frame 30 may have rows 81 of sockets 43 evenly spaced along the entire length of side supports 26, 27 without departing from the scope of this invention.

Sockets 43 are typically approximately one half inch (½") in inside diameter at front face 31 to accommodate a one half inch (½") outside diameter support tube 50 therein. Sockets 43 may be slightly tapered inwardly from front face 31 to wall 40 making a force fit with support tube 50 which tends to retain support tube 50 within socket 43. In this manner, when modular unit 20 is assembled with multiple support tubes 50 arranged in multiple sockets 43 and one end frame 30 is tapped with a suitable instrument, support tubes 50 are fixedly retained in sockets 43, however, it is understood that modular unit 20 may be disassembled in a reverse manner to allow for rearrangement of support tubes 50 within other sockets 43 or for moving of modular unit 20 to another location.

In FIG. 4, sockets 43A in one end frame 30A are approximately one eighth inch (⅛") in diameter larger than sockets 43B in the facing end frame 30B to accommodate an enlarged end 91 of telescoping support tube 90. Sockets 43B in facing end frame 30B are approximately one half inch (½") in inside diameter to accommodate the end 92 of telescoping support tube 90. Since sockets 43A in one end frame 30A are all the same diameter and sockets 43B in facing end frame 30B are likewise the same diameter, the arrangement of telescoping support tubes 90 to construct a modular unit 20 may take place in the same manner as described above for support tubes 50 for a modular unit 20. However, since telescoping support tubes 90 will merely slide together when facing end frame 30B is tapped with a suitable instrument, the construction of a modular unit 20A having reduced end tube 99 equal in length to enlarged end tube 98 must proceed differently. Therefore, the enlarged end tube 98 must be separated from the reduced end tube 99 and one enlarged end 91 of enlarged end tube 98 must be first fitted into each desired socket 43A and tapped with a suitable instrument upon the opposite end 96 to seat enlarged end tube 98 of telescoping tube 90 therewithin. In a like manner, one reduced end 92 of each reduced end tube 99 must be fitted into each corresponding socket 43B in facing frame 30B and tapped with a suitable instrument upon the other end 97 to seat reduced end 92 of reduced end tube 99. Modular unit 90 is then assembled by reassembling each telescoping support tube 90 by sliding other end 97 of reduced end tube 99 within opposite end 96 of enlarged end tube 98.

It is also possible to make enlarged end tube 98 of telescoping tube 90 shorter than reduced end tube 99 by approximately the depth of one socket 43B and proceed with assembly as described for a modular unit 20. Since reduced end tube 99 is noes longer than enlarged end tube, other end 97 of reduced end tube 99 will abut wall 40 in socket 43. A of frame 30A providing support for seating of reduced end 92 within socket 43B and the end of peripheral wall 38 will supply support for opposite end 96 of enlarged tube 98 to be seated within socket 43A when frame 30B is tapped upon its rear face with a suitable instrument. When fully assembled, modular unit 20 may be extended by sliding reduced end tube 99 within enlarged end tube 98 to fit modular unit 20 into the desired space, however, modular unit 20 may also be additionally extended lengthwise by mating another frame 30A or frame 30 back to back with opposing frame 30B in the same manner as the assembly of rack system 10 described above in the preferred embodiment. Likewise, additional units 20 may be assembled upon the top surface of a first unit 20 by mating tongue 113 with groove 114 in each successive lower unit 20. It is obvious from the above description that frames 30 of modular units 20 in FIGS. 1–3 may be attached to frames 30A or 30B of FIG. 4 and be releasably secured thereto as joining means 60 disposed within sockets 43, 43A or 43B of any of frames 30, 30A and 30B respectively, are at the same spacing and therefore align when placed back to back. One skilled in the art may substitute a steel, wood, aluminum or plastic dowel for reduced end tube 99 slidably received in enlarged end tube 98 to assemble modular units 20 without departing from the scope of this invention.

Referring again to FIGS. 2, 5 and 6 second surface 42 has cylindrical projections 56, defining reinforcement means 45, protruding from wall 40 which are approximately centered on second surface 42 of annulus 39. Cylindrical projections 56 are approximately three eighths inch (⅜") in height and approximately three eighths inch (⅜") in diameter having openings 61 or 61' centrally disposed therein. Rear stiffening rib 44 protrudes from second surface 42 of wall 40 and is also approximately centered in annulus 39 and on each cylindrical projection 56. Rear stiffening rib 44 connects with each cylindrical projection 56 at connection point 57 and continues uninterrupted to the next cylindrical projection 56 extending completely around wall 40. Rear stiffening rib 44 is shown in FIG. 6 to be the same height as cylindrical projection 56 and is therefore also approximately three eighths inch (⅜") in height but may be shorter in height than cylindrical projection 56. In this preferred embodiment, cylindrical projection 56 and rear stiffening rib 44 extend to and become a part of rear face 32 defined by a rear edge 53 of flange 46.

In an alternative embodiment, not shown, stiffening rib 44 may comprise multiple reinforcement ribs separately extending from second face 42 of wall 40 continuing uninterrupted around second surface 42, one rib disposed toward flange 46 tangent with each cylindrical projection 56 and another rib disposed toward inner edge 48 of annulus 39 and tangent with each cylindrical projection 56 at a point opposite the tangency of the one rib. In yet another embodiment, not shown, multiple stiffening ribs 44 are constructed on side supports 26, 27 while top 28 and bottom 29 have only one centrally disposed stiffening rib 44. In yet another alternative embodiment, not shown, a second flange inscribes inner edge 48 of annulus 39 extending from front face 31 to rear face 32. The height, thickness, spacing and number of ribs 23, 44 on either or both sides of any of sections 26 through 29 may be different from other ribs 23, 44 without departing from the scope of this invention. Likewise, the arrangement of any of ribs 23, 44 may be altered.

Again referring to FIG. 1, each joining means 60 comprises a pair of openings 61, 61' formed in sockets 43 through wall 40 and reinforcement means 45. Opening 61 is generally formed in rear sockets 89 of each row 81 while opening 61' is generally formed in front sockets 88. Therefore, when one frame 30 is reversed to assemble a modular unit 20, each end 21, 22 has a column of openings 61 and a column of openings 61' ready to accept a frame 30 of another modular unit 20 with all of openings 61 in each frame 30 aligning with all of openings 61' in the other frame 30. In this manner, if two sockets 43 in each set 80 are fitted with support tubes 50, the other two sockets 43 have openings 61 and 61' available for accepting fastening means 70 therein. Therefore, since each of frames 30 has at least two sets 80 of sockets 43, at least four joining means 60 are available for securing frames 30 together.

In another embodiment, not shown, opening 61 is formed in every other socket 43 of rear sockets 89 and front sockets 88 while opening 61' is formed in the alternate sockets 43. In this embodiment, opening 61 is formed in the uppermost rear socket 102 and the lowermost front socket 101 of each set 80 as sockets 43 are viewed from front face 32. Opening 61' is then formed in the lowermost rear socket 100 and the uppermost front socket 103 of each set. It is apparent that all of openings 61 in each frame 30 align with all of openings 61' in the other frame 30. In this manner, if two sockets 43 in each set 80 are fitted with support tubes 50, the other two sockets 43 have openings 61 and 61' available for accepting fastening means 70 therein. Therefore, since each of frames 30 has at least two sets 80 of sockets 43, at least four joining means 60 are available for securing frames 30 together.

In any of the embodiments above, each opening 61, 61' in wall 40 is centered in socket 43 and extends through cylindrical projection 56 and is centered therein. Openingy 61 is approximately 0.18 inch inside diameter and is adapted to slidably receive fastening means 70 therethrough as the major diameter of fastening means 70 is slightly less than 0.18 inch. Opening 61' is approximately 0.15 inch inside diameter to fixedly engage the threads, splines, flutes or knurls of fastening means 70 therein. Since opening 61' is smaller than the major diameter of fastening means 70, fastening means 70 must be forcibly engaged with opening 61' by threading a screw, or hammering a splined, fluted or knurled rivet thereinto.

As can be readily appreciated, in the embodiments above, when frame 30 is to be mated with another frame 30 back to back, two openings 61 in each set 80 of sockets 43 of frame 30 align with two openings 61' of the reversed frame 30 of a first unit and are removably affixed thereto utilizing fastening means 70 in at least one opening 61 of each set 80 of sockets 43. Any or all of openings 61 may receive fastening means 70 therein as desired by the assembler of modular units 20. It is as readily apparent that those sockets 43 which have opening 61' exposed cannot receive a fastening means 70 therein from front face 31 but are assembled with fastening means 70 projecting therethrough from front face 31 of the mating frame 30. For instance, two frames 30 may be mated at mating surface 35 prior to assembly of any of support tubes 50 or 90 and fastened together in all sockets 43 by inserting fastening means in each opening 61 and engaging each fastening means 70 into each opening 61', half of the fastening means 70 being inserted into sockets 43 in one frame 30 with the other half of fastening means 70 being inserted into sockets 43 in the other frame 30. The pair of frames 30 thus assembled may then be utilized to construct a pair of modular units 20 in the same manner as was described for assembling a single modular unit 20.

Fastening means 70 typically have a enlarged end 71 formed on one end thereof adapted to retain one mating member to another while the engaging end 72 comprising threads, splines, flutes or knurls is forcibly engaged in the other member to be retained. Enlarged ends 71 of fastening means 70 utilized to assemble modular units 20 in back to back relationship are adapted to engage wall 40 within socket 43 to retain a second frame 30 to the opposite frame 30 while the engaging end 72 of fastening means 70 is engaged in opening 61' of first frame 30. Head 71 is approximately three eighths of an inch (⅜") in diameter and positively retains wall 40 of second frame 30 against rear face 32 of first frame 30 at mating surface 35.

In order to assemble modular units 20 bottom to top and fixedly retain the upper unit 20 to the lower unit 20, tongue 113 projects from bottom surface 37 of bottom section 28 of each frame 30 and is sized to be received in groove 114 formed in top surface 36 of top section 29 of another frame 30. Groove 114 is approximately one eighth inch (⅛") in width and one quarter inch (¼") in depth. Groove 114 generally extends a substantial length of top surface 36 and is centrally disposed between front face 31 and rear face 32 of flange 46. Thus groove 114 is also disposed directly atop wall 40 on top surface 36 opposite inside surface 47 of flange 46. Therefore, a bulbous portion 62 is provided on both first surface 41 and second surface 42 of wall 40 contiguous therewith and attached to inside surface 47 of flange 46. In cross section, bulbous portion 62 is a quadrant of a circle approximately three thirty-secondths inch (³⁄₃₂") in radius having its center in the center of groove 114 at surface 47. Thus, bulbous portion 62 encases groove 114 while providing additional support to flange 46 and wall 40 of top section 29. Bulbous portion 62 extends the entire length of wall 40 at surface 47 and blends into surface 47 at juncture 25 with side supports 26, 27. Tongue 113 is the same thickness as wall 40 protruding from bottom surface 37 of bottom section 28 approximately one quarter inch (¼"). Tongue 113 is approximately the same length as the width of wall 40 between side supports 26 and 27 but has a reduced height portion 119 centrally disposed. Therefore, tongue 113 comprises two tongue portions however, tongue 113 may comprise several smaller tongue projections all adapted to be received within groove 114.

A method of making the storage rack system 10 of this invention is provided wherein at least one mold half has replaceable insert portions for manufacturing frames 30. Replaceable insert portions have different sized recesses for forming sockets 43 adapting these sockets to receive different diameter support tubes 50 therein. End frames 30 are generally molded of a thermoplastic material such as polyethylene, polypropylene, polystrene, polyvinylchloride or combinations thereof, any of which may contain colorants, fillers and/or reinforcing fibrous material. The molding operation may be by compression molding, transfer molding or the preferred method, injection molding. Each half of the mold is a mirror image of one face 31, 32 of frame 30 and is rectangular in shape having cavities therein to define the two upright supports 26, 27, a top 29 and a bottom 28. The cavities may have rounded corners defining corners 24 or each of the parts 26, 27, 28 and 29. Upright supports 26, 27, top 29 and bottom 28 may be molded separately to be joined together at juncture 25 in a separate operation. In the preferred embodiment, frame 30 is molded as an integral unit having a centrally disposed wall 40 surrounded by a flange 46. Therefore, the cavities in one of the mold halves define the portion of flange 46 from surface 41 to face 31, reinforcing rib 23 and outer periphery 121 of bosses 34. The cavities in the other half of the mold define the portion of flange 46 from surface 42 to rear face 32, stiffening rib 44 and the outer periphery 123 of cylindrical projection 56. The width of each cavity is approximately one eighth inch (⅛") in width at its respective surface 31, 32 and the depth of each cavity is approximately three eighths inch (⅜") deep from the respective surface 31, 32.

In order to provide for wall 40 and tongue 113, each half of the mold further has a shallow cavity defining half the thickness of annulus 39 extending from the inner periphery of the cavity for flange 46 approximately one sixteenth inch (¹⁄₁₆") in depth and one inch (1") in width terminating at a surface defining inner edge 48. The end of this cavity at bottom 37 defining tongue 113 extending beyond the cavity defining flange 46 at bottom surface 37 may have a draft angle of approximately one degree tapering upwardly from the cavity defining flange 46 to the apex 116 of tongue 113. The cavity defining tongue 113 further has a notch defining reduced height portion 119 dividing tongue 113 into two separate tongue portions 113. Contiguous with the inner edge of the cavity defining flange 46 at top 29 is a cavity defined by a three thirty-secondths inch (³⁄₃₂") radius extending from one edge of the cavity to the other bisecting corner 24 at juncture 25. This semicircular cavity provides for bulbous portion 62 on first surface 41. A similar cavity is machined into the other half of the mold providing for portion 62 on rear surface 42.

Groove 114 is formed into top surface 36 by a powered slide approximately one quarter inch (¼") in height, one eighth inch (⅛") thick and substantially the width of top surface 36. This slide is extended into the cavity defining bulbous portion 62 and flange 46 at top surface 36 prior to injecting the thermoplastic material of frame 30 into the closed mold and is retracted before the mold is opened after completion of the injection cycle.

Openings 61 and 61' are extensions of the ejector pins provided in each cavity at the locations of sockets 43 and extend from the end of the ejector pin through the cavity defining cylindrical projection 56 into a blind aligning hole in the other half of the mold. Inner surface 33 of socket 43 is defined by the outer diameter of the ejector pins at each location of sockets 43. When the injection cycle is complete and the slide is retracted from groove 114, the upper half of the mold defining rear surface 42 is lifted away from the lower half of the mold and the injector pins then push the completed part from the mold. In doing so, the pins defining 61, 61' remain stationary while the portion of the ejector pins defining sockets 43 force the frame 30 from the lower half of the mold.

In order to provide for each of frames 30, 30A and 30B, a molding insert is produced which defines a short section of flange 46 from below each lower most row 83 of each set 80 to just above the uppermost row 84 which encompasses the portion of wall 40 from inner edge 48 to flange 46. The removable insert has a cavity defining a short section of flange 46, outer periphery 121 of boss 34 of both sockets 88 or 89, and the length of reinforcing rib 23 between sockets 88 or 89 and the cavity defining that portion of wall 40. Therefore, when one of frames 30, 30A or 30B is to be manufactured, the mold plate is fitted with inserts at each row of sockets defining the respective set of sockets for that frame and the ejector pins are fitted with the proper size to define socket 43, 43A or 43B. It should be noted that since rear face 32, stiffening rib 44, cylindrical portion 56 and opening 61' remain the same for each of frames 30, 30A and 30B, no modification to the opposing half of the mold is necessary.

Support tubes 50 may be formed from metal tubing in a continuous extrusion and cut to length utilizing means well known in the art but are usually formed from an elongated, thin, narrow flat metallic strip having "U" shaped groove along each edge of the narrow strip which is rolled from one edge toward the other edge to form a tube. The "U" shaped portions are then interengaged to complete the formation of the tube 50. Tubes 50 are generally formed of steel sheet metal but may be formed of any suitable material with sufficient lateral strength to support the objects thereupon. Therefore, tubes 50, 98 & 99 may be made from aluminum, steel, brass, thermoplastic or combinations of the above and may be extruded from these materials and coated with another material as desired. Alternately, tubes 50 or 99 could be solid and made from steel, aluminum, wood or plastic rods or dowels.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. In a storage rack system consisting of modular units, each said modular unit adapted to be free standing and comprising parallel end frames separated by at least two parallel support tubes fitted into sockets formed in a front face of each said frame, each said socket having an internal diameter, wherein the improvement comprises each said frame having openings in a rear face thereof, each of said openings opening into and being axially aligned with a respective one of said sockets, each said opening having an internal diameter different than said internal diameter of each said socket, said openings comprising a part of a means for releasably joining and securing one said end frame of one said modular unit to another said end frame of another said modular unit in a back to back relationship with said rear face of said one said end frame of said one said modular unit abutting said rear face of said another said end frame of said another said modular unit to extend said storage rack system lengthwise to occupy available horizontal space.

2. A storage rack system as in claim 1 wherein said end frames of each said modular unit are identical and said front faces of said end frames of each said modular unit faces one another.

3. A storage rack system as in claim 1 wherein each of said openings opens through an end wall of said respective one of said sockets, said openings of each said frame extend through said rear face of said frame.

4. A storage rack system as in claim 3 wherein said means for releasably joining and securing comprises a fastening means extending through at least two of said sockets of said one said end frame of said one said modular unit and threadedly engaged within said openings of said another said end frame of said another said modular unit.

5. A storage rack system as in claim 4 wherein said fastening means has enlarged end heads which are adapted to be received in tubular openings of said support tubes.

6. A storage rack system as in claim 1 wherein said sockets of each said frame are arranged in sets, each said set comprising parallel horizontal rows of said sockets, each said row comprising at least two said sockets lying on a horizontal line, wherein said rows of each said set are equally spaced apart by a first distance and said sets of each said frame are equally spaced apart by a second distance.

7. A storage rack system as in claim 6 wherein each said frame has at least two said sets of said sockets, each said set of said sockets having two said parallel horizontal rows of said sockets.

8. A storage rack system as in claim 6 wherein each said frame includes at least two said sets of said sockets spaced apart from one another by a distance equal to twice a distance a lowermost one of said at least two said sets of said sockets is spaced from a bottom surface of said frame.

9. A storage rack system as in claim 8 wherein each of said at least two said sets of said sockets has two said parallel horizontal rows of said sockets.

10. A storage rack system as in claim 9 wherein said at least two said sets of said sockets and said support tubes provide for forward sloping storage for heeled shoes and boots.

11. A storage rack system as in claim 9 wherein said support tubes provide for flat shelf storage of shoe boxes and flat soled slippers.

12. In a storage rack system consisting of modular units, each said modular unit adapted to be free standing and comprising parallel end frames separated by at least two parallel support tubes fitted into sockets formed in a front face of each said end frame, each said socket having an internal diameter, wherein the improvement comprises each said end frame having openings in a rear face thereof, each of said openings opening into and being axially aligned with a respective one of said sockets, each said opening having an internal diameter different than said internal diameter of each said socket, said openings comprising a part of a means for releasably joining and securing a first said end frame of a first said modular unit, a second said end frame of a second said modular unit and a third said end frame of a third said modular unit with a lower portion of said rear face of said third said end frame abutting an upper portion of said rear face of said first said end frame and an upper portion of said rear face of said third said end frame abutting a lower portion of said rear face of said second said end frame.

13. In a storage rack system consisting of modular units, each said modular unit being free standing, each said modular unit comprising parallel end frames separated by at least two parallel support tubes fitted into sockets formed in a front face of each said frame, wherein the improvement comprises each said frame having multiple sets of said sockets disposed on the front face thereof, each said set comprising vertically disposed, parallel horizontal rows of said sockets wherein one of said horizontal rows of each said multiple sets of said sockets comprises an uppermost row and another one of said horizontal rows of each said multiple sets of said sockets comprises a lowermost row, each said frame having openings in a rear face thereof, each of said openings opening into and being axially aligned with a respective one of said sockets, each said socket having an internal aperture, said openings and a fastening means comprise a means for joining one said modular unit to another said modular unit, each said opening having an internal aperture having a different size than said internal aperture of each said socket.

14. A storage rack system as in claim 13 wherein said rows of each said set are equally spaced apart by a first distance and said sets are equally spaced apart by a second distance.

* * * * *